(12) United States Patent
Tanaka et al.

(10) Patent No.: US 12,450,481 B2
(45) Date of Patent: Oct. 21, 2025

(54) DISTRIBUTED PROCESSING COMPUTER AND DISTRIBUTED DEEP LEARNING SYSTEM

(71) Applicant: NTT, Inc., Tokyo (JP)

(72) Inventors: Kenji Tanaka, Tokyo (JP); Yuki Arikawa, Tokyo (JP); Tsuyoshi Ito, Tokyo (JP); Kazuhiko Terada, Tokyo (JP); Takeshi Sakamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 791 days.

(21) Appl. No.: 17/777,217

(22) PCT Filed: Dec. 2, 2019

(86) PCT No.: PCT/JP2019/046966
§ 371 (c)(1),
(2) Date: May 16, 2022

(87) PCT Pub. No.: WO2021/111490
PCT Pub. Date: Jun. 10, 2021

(65) Prior Publication Data
US 2022/0391701 A1 Dec. 8, 2022

(51) Int. Cl.
*G06N 3/08* (2023.01)
(52) U.S. Cl.
CPC ..................... *G06N 3/08* (2013.01)
(58) Field of Classification Search
None
See application file for complete search history.

(56) References Cited

U.S. PATENT DOCUMENTS

| | | | | |
|---|---|---|---|---|
| 2019/0325302 | A1* | 10/2019 | Savic | G06N 3/08 |
| 2021/0103820 | A1* | 4/2021 | Ghosh | G06N 3/084 |
| 2021/0357760 | A1* | 11/2021 | Tanaka | G06N 3/10 |
| 2022/0076115 | A1* | 3/2022 | Nam | G06N 3/08 |

(Continued)

OTHER PUBLICATIONS

Huang et al., "GPipe: Efficient Training of Giant Neural Networks using Pipeline Parallelism," arXiv:1811.06965v1 [cs.CV], Nov. 16, 2018, 11 pages.

(Continued)

*Primary Examiner* — June Sison
(74) *Attorney, Agent, or Firm* — Slater Matsil, LLP

(57) ABSTRACT

An embodiment is a computer including a plurality of accelerators, a computer for distributed processing includes a plurality of accelerators to each of which a part of a neural network is assigned and each of which is configured to derive a learning result based on input data and update each parameter value included in the part of the neural network by using the learning result; a plurality of network interface circuits each of which is configured to transmit and receive information on learning including the learning result via a network, and an arithmetic processing unit that is configured to control the plurality of accelerators and the plurality of network interface circuits to cause each of the plurality of accelerators to derive a learning result based on input data and to cause the plurality of network interface circuits to transmit and receive information on learning including the learning result.

12 Claims, 12 Drawing Sheets

(56) References Cited

U.S. PATENT DOCUMENTS

| | | | | |
|---|---|---|---|---|
| 2022/0245452 A1* | 8/2022 | Arikawa | ................ | G06N 3/084 |
| 2022/0391666 A1* | 12/2022 | Arikawa | ................ | G06N 3/04 |
| 2022/0398431 A1* | 12/2022 | Tanaka | ................ | G06N 3/04 |

OTHER PUBLICATIONS

Takumi et al., "Using ResNet-50/ImageNet Learning Video in Large GPU Clusters," Research Report by Information Processing, Society of Japan, IPSJ SIG Technical Report, vol. 2019-HPC-170 No. 6, Jul. 24, 2019, 15 pages.

\* cited by examiner

Fig. 7

| ACCELERATOR 1 | F11 | F12 | F13 | F14 | | | | | | | | B11 | B12 | B13 | B14 | BATCH AVERAGING | UPDATE |
| --- | --- | --- | --- | --- | --- | --- | --- | --- | --- | --- | --- | --- | --- | --- | --- | --- | --- |
| FPGA NIC 1 | | | | | | | | | | | | | FIRST LAYER COMMUNICATION | FIRST LAYER COMMUNICATION | FIRST LAYER COMMUNICATION | | |
| ACCELERATOR 2 | | F21 | F22 | F23 | F24 | | | | | | B21 | B22 | B23 | B24 | | BATCH AVERAGING | UPDATE |
| FPGA NIC 2 | | | | | | | | | | | | SECOND LAYER COMMUNICATION | SECOND LAYER COMMUNICATION | SECOND LAYER COMMUNICATION | | | |
| ACCELERATOR 3 | | | F31 | F32 | F33 | F34 | | | | B31 | B32 | B33 | B34 | | | BATCH AVERAGING | UPDATE |
| FPGA NIC 3 | | | | | | | | | | THIRD LAYER COMMUNICATION | THIRD LAYER COMMUNICATION | THIRD LAYER COMMUNICATION | | | | | |
| ACCELERATOR 4 | | | | F41 | F42 | F43 | F44 | | B41 | B42 | B43 | B44 | | | | BATCH AVERAGING | UPDATE |
| FPGA NIC 4 | | | | | | | | | FOURTH LAYER COMMUNICATION | FOURTH LAYER COMMUNICATION | FOURTH LAYER COMMUNICATION | | | | | | |

Fig. 11

| | | | | | | | | | | | | | | | | |
|---|---|---|---|---|---|---|---|---|---|---|---|---|---|---|---|---|
| ACCELERATOR 1 | | | | | | | | | | | | B11 | B12 | B13 | B14 | BATCH AVERAGING | UPDATE |
| FPGA NIC 1 | F11 | F12 | F13 | F14 | | | | | | | | | FIRST LAYER COMMUNICATION | FIRST LAYER COMMUNICATION | FIRST LAYER COMMUNICATION | | |
| ACCELERATOR 2 | | F21 | | | | | | | | B21 | B22 | B23 | B24 | | BATCH AVERAGING | UPDATE |
| FPGA NIC 2 | | | F22 | F23 | F24 | | | | | | SECOND LAYER COMMUNICATION | SECOND LAYER COMMUNICATION | SECOND LAYER COMMUNICATION | | | |
| ACCELERATOR 3 | | | | | | B31 | B32 | | | B33 | B34 | | | BATCH AVERAGING | UPDATE | |
| FPGA NIC 3 | | | F31 | F32 | F33 | F34 | | THIRD LAYER COMMUNICATION | THIRD LAYER COMMUNICATION | THIRD LAYER COMMUNICATION | | | | | | |
| ACCELERATOR 4 | | | | | | | B41 | B42 | B43 | B44 | | | | | BATCH AVERAGING | UPDATE |
| FPGA NIC 4 | | | | F41 | F42 | F43 | F44 | FOURTH LAYER COMMUNICATION | FOURTH LAYER COMMUNICATION | FOURTH LAYER COMMUNICATION | FOURTH LAYER COMMUNICATION | | | | | |

Fig. 13

| | T1 | T2 | T3 | T4 | T5 | T6 | T7 | T8 | T9 | T10 | T11 | T12 | T13 | T14 | T15 | T16 |
|---|---|---|---|---|---|---|---|---|---|---|---|---|---|---|---|---|
| ACCELERATOR 1 | F 11 | F 12 | F 13 | F 14 | | | | | B 11 | B 12 | B 13 | B 14 | BATCH AVERAGING | | | UPDATE |
| ACCELERATOR 2 | | F 21 | F 22 | F 23 | F 24 | | | B 21 | B 22 | B 23 | B 24 | | BATCH AVERAGING | | | UPDATE |
| ACCELERATOR 3 | | | F 31 | F 32 | F 33 | F 34 | B 31 | B 32 | B 33 | B 34 | | | BATCH AVERAGING | | | UPDATE |
| ACCELERATOR 4 | | | | F 41 | F 42 | F 43 | F 44 | B 41 | B 42 | B 43 | B 44 | | | BATCH AVERAGING | | UPDATE |
| N I C | | | | | | | | | | | | FIRST LAYER COMMUNICATION | SECOND LAYER COMMUNICATION | THIRD LAYER COMMUNICATION | FOURTH LAYER COMMUNICATION | |

DISTRIBUTED PROCESSING COMPUTER AND DISTRIBUTED DEEP LEARNING SYSTEM

CROSS-REFERENCE TO RELATED APPLICATIONS

This application is a national phase entry of PCT Application No. PCT/JP2019/046966, filed on Dec. 2, 2019, which application is hereby incorporated herein by reference.

TECHNICAL FIELD

The present disclosure relates to a computer for distributed processing and a distributed deep learning system. It particularly relates to: a computer for distributed processing that has an arithmetic processing unit (central processing unit: CPU), a plurality of accelerators, and a network interface circuit; and a distributed deep learning system that uses a plurality of the computers for distributed processing.

BACKGROUND

In deep learning by a multilayer neural network, a model that is fit to input data is learned by alternately performing feed forward and back propagation. To efficiently perform feed forward and back propagation, an accelerator such as a graphics processing unit (GPU) has been used in recent years.

Further, in recent years, a data size and a model size have increased and therefore, a method for performing distributed processing for them has been proposed.

For example, in processing deep learning with one computer, an increase in input data size causes a bottleneck in a storage or an I/O to occur. Therefore, "data parallel distributed deep learning" in which learning is performed with data distributed among a plurality of computers has been proposed.

In addition, when a model size increases, it becomes impossible to record the whole model in a device memory of one accelerator and it becomes necessary to store the model in a main memory. This causes a delay to occur due to reading and writing of model data in the accelerator. Therefore, "pipeline parallel distributed deep learning" in which learning is performed with a model distributed using a plurality of accelerators has been proposed.

In parallel distributed deep learning, both the distributed processing using a plurality of computers (data parallelism) and distributed processing within a computer (pipeline parallelism) which are described above can be used together.

In the data parallel distributed deep learning, each of the plurality of computers performs feed forward and back propagation independently for each computer, based on divided data; individually derives weight data of a model (replica); and shares the individually derived weight data after back propagation, among all the computers through communication. This sharing of the weight data is a collective communication called "Allreduce." This Allreduce processing includes processing of: calculating the total of the weight data after back propagation which is obtained for each computer (Reduce); and distributing to all the computers (Broadcast). Each of the computers updates each parameter value with the shared weight data after the Allreduce processing (average of the weight data derived by each of the computers, in many cases).

This Allreduce is known to have an important role in the data parallel distributed deep learning but to become a bottleneck.

On the other hand, in the pipeline parallel distributed deep learning, each layer of a multilayer neural network is assigned to each one of the accelerators. Each of the accelerators transfers a computation result, on completion of processing of an assigned layer, to an accelerator which has been assigned with a layer lower than that of itself; and starts processing of the next data. Such processing is called pipeline processing.

FIG. 12 illustrates a configuration example of a computer used in the parallel distributed deep learning described above.

As illustrated in FIG. 12, a computer 100 includes a CPU 120, a plurality of accelerators 130-1 to 130-4, and a network interface card (NIC) 140. Here, the plurality of accelerators 130-1 to 130-4 respectively correspond to a plurality of layers of a neural network.

In the computer 100 like this, each of the accelerators 130-1 to 130-4 performs feed forward processing and back propagation processing based on data that is input for learning and eventually calculates a parameter value of the neural network. As illustrated in FIG. 13, the computer 100 in this example collectively processes four pieces of data by the plurality of accelerators 130-1 to 130-4. The plurality of pieces of data which are collectively processed are called "mini batch." That is, each time a mini batch including four pieces of data is input, the computer 100 performs feed forward processing and performs back propagation processing for each of the pieces of data sequentially by pipeline parallel processing; thereby calculating the average of learning results which have been derived for each of the pieces of data.

In FIG. 13 and the like, "Fij" represents feed forward processing based on the j-th data included in a mini batch by an accelerator corresponding to an i-th layer of a neural network (the i-th accelerator); "Bik" represents back propagation processing based on an output result for the k-th data by the i-th accelerator. For example, in FIG. 13, "F11" represents feed forward processing based on the first data included in a mini batch by an accelerator 1 to which the first layer of a neural network has been assigned; "F21" represents feed forward processing performed by an accelerator 2 to which a second layer of the neural network has been assigned, based on a result of the feed forward processing F11. Similarly, "B41" represents back propagation processing that is performed, based on a result of the feed forward processing F41 by an accelerator 4 to which a fourth layer (output layer) of the neural network has been assigned, by the same accelerator 4; and "B31" represents back propagation processing that is performed, based on a result of the back propagation processing B41, by an accelerator 3 to which a third layer of the neural network has been assigned.

In a common pipeline parallelism, after an average of learning results derived for each piece of data included in a mini batch is calculated, each parameter is updated by using this average of the learning results and processing of the next mini batch is started. However, in a case of using both pipeline parallelism and data parallelism, Allreduce processing is executed with another computer that is communicably connected via a network, between averaging processing for the learning results with a mini batch and parameter update processing.

CITATION LIST

Non-Patent Literature

Non-Patent Literature 1: Huang, Yanping, et al. "Gpipe: Efficient training of giant neural networks using pipeline parallelism." arXiv preprint arXiv: 1811.06965 (2018)

SUMMARY

Technical Problem

However, when the number of NICs is not sufficient for the number of accelerators, learning results come all at once to the NICs, causing congestion to occur and this makes the Allreduce processing a serious bottleneck.

Therefore, it is an object of embodiments of the present invention to provide a computer including a plurality of accelerators, a distributed deep learning system, and a method that allow distributed deep learning to be performed in a shorter period of time by using the computer.

Means for Solving the Problem

In order to achieve the above object, a computer for distributed processing (10-1, 10-2) according to embodiments of the present invention includes: a plurality of accelerators (13-1 to 13-4) to each of which a part of a neural network is assigned and each of which is configured to derive a learning result based on input data and update each parameter value included in the part of the neural network by using the learning result; a plurality of network interface circuits (14-1 to 14-1) each of which is configured to transmit and receive information on learning including the learning result via a network; and an arithmetic processing unit (12) that controls the plurality of accelerators and the plurality of network interface circuits to cause each of the plurality of accelerators to derive a learning result based on input data and cause the plurality of network interface circuits to transmit and receive, in parallel, information on learning including the learning result which is derived by each of the plurality of accelerators.

Further, a distributed deep learning system according to embodiments of the present invention includes a plurality of computers (10-1, 10-2) that are communicably connected with each other via a network, wherein each of the plurality of computers is the computer for distributed processing described above, the plurality of network interface circuits (14-1 to 14-1) of one computer of the plurality of computers transmits and receives, in parallel, both a plurality of learning results which are derived by each of the plurality of accelerators of the one computer and a plurality of learning results which are derived by each of a plurality of accelerators of the other computer of the plurality of computers, and the plurality of accelerators (13-1 to 13-4) of the one computer updates the parameter value based on both the learning results which are derived by the plurality of accelerators and the plurality of learning results which are received from the other computer via the plurality of network interface circuits.

Effects of Embodiments of the Invention

According to embodiments of the present invention, information on learning including the learning result which is derived by each of the plurality of accelerators is transmitted and received in parallel by the plurality of network interface circuits, thus allowing distributed deep learning to be performed in a shorter period of time.

BRIEF DESCRIPTION OF THE DRAWINGS

FIG. 7 is a diagram for describing one example of an operation of a computer for distributed processing according to a second embodiment of the present invention.

FIG. 11 is a diagram for describing one example of an operation of the computer for distributed processing according to the fourth embodiment of the present invention.

FIG. 13 is a diagram for describing one example of an operation of the conventional computer for distributed processing.

DETAILED DESCRIPTION OF ILLUSTRATIVE EMBODIMENTS

Hereinafter, embodiments of the present invention will be described with reference to drawings.

First Embodiment

[Configurations of Distributed Deep Learning System and Computer for Distributed Processing]

Figure 1:
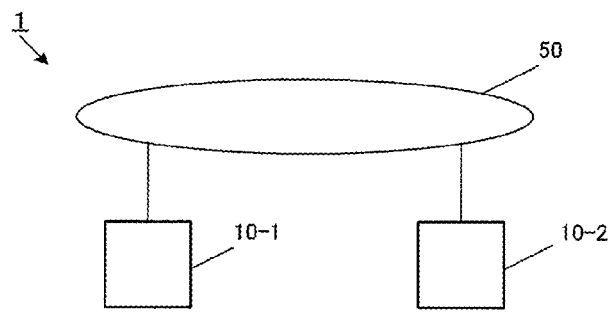
FIG. 1 is a diagram illustrating an overview of a distributed deep learning system according a first embodiment of the present invention.

A distributed deep learning system according to a first embodiment of the present invention is a data-parallel deep learning system that performs learning while distributing data among a plurality of computers for distributed processing that are communicably connected with each other. As illustrated in FIG. 1, a distributed deep learning system 1 includes two computers for distributed processing 10-1 and 10-2 that are communicably connected with each other via a communication network 50.

Figure 2:
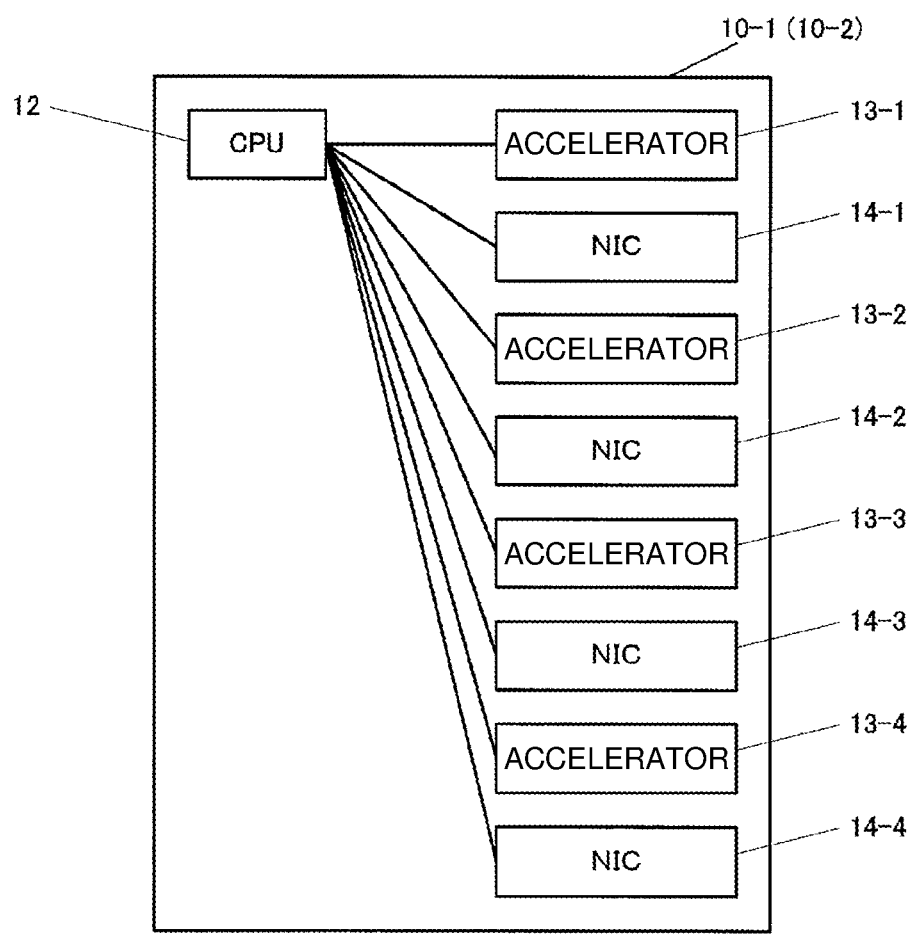
FIG. 2 is a diagram illustrating a configuration of a computer for distributed processing that constitutes the distributed deep learning system according the first embodiment of the present invention.

The computers for distributed processing 10-1 and 10-2 have the same hardware configuration as each other. As illustrated in FIG. 2, each of the computers for distributed processing 10-1 and 10-2 includes: a plurality of accelerators 13-1 to 13-4, a plurality of network interface cards (hereinafter referred to as "NIC") 14-1 to 14-4, and a central processing unit (hereinafter referred to as "CPU") 12 that controls these accelerators 13-1 to 13-4 and NICs 14-1 to 14-4.

Here, as the accelerators 13-1 to 13-4, for example, a GPU, a field-programmable gate array (FPGA), a digital signal processor (DSP), and the like can be used.

In addition, the NICs 14-1 to 14-4 are card-type extension devices each for connecting the computers for distributed processing 10-1 or 10-2 to the communication network 50.

In FIG. 1, the accelerators 13-1 to 13-4 and the NICs 14-1 to 14-4 are connected via the CPU 12, which is an example of connection using PCI Express (PCIe). Alternatively, the accelerators 13-1 to 13-4 and the NICs 14-1 to 14-4 may be connected via a PCIe switch not via the CPU.

Figure 3:
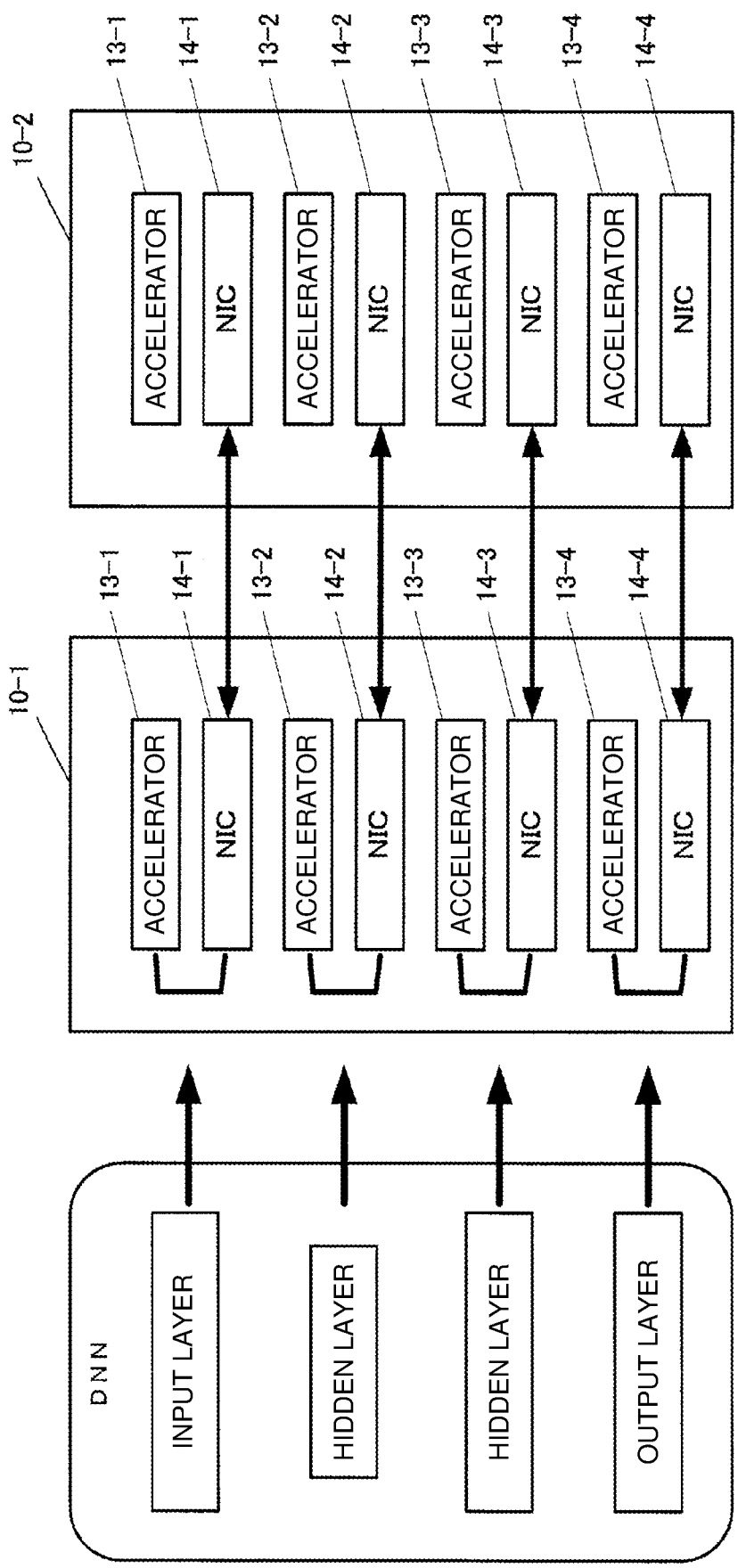
FIG. 3 is a diagram for describing a relationship between a neural network and the computer for distributed processing.

Each of the computers for distributed processing 10-1 and 10-2 is a device that emulates a deep layer neural network having a plurality of intermediate layers. More specifically, as illustrated in FIG. 3, a deep layer neural network DNN is divided into several pieces in units of layers and a plurality of layers are assigned to accelerators 13-1 to 13-4 of each of the computers for distributed processing 10-2 and 10-2. In this embodiment, each divided layer corresponds to "a part of a neural network" in the present invention. Note that in FIG. 3, the CPUs 12 of the computers for distributed processing 10-1 and 10-2 are not illustrated for simplification.

Each of the plurality of NICs 14-1 to 14-4 is associated with any of the plurality of accelerators 13-1 to 13-4. In this embodiment, the same number of NICs 14-1 to 14-4 as the accelerators 13-1 to 13-4 are provided and the NICs 14-1 to 14-4 and the accelerators 13-1 to 13-4 are associated with each other on a one-to-one basis. As a result, each layer of the deep layer neural network DNN is assigned to a pair of an accelerator and an NIC.

[Operations of Distributed Deep Learning System and Computer for Distributed Processing]

In the distributed deep learning system according to this embodiment, different input data is given to the computers for distributed processing 10-1 and 10-2 for data parallelism.

In each of the computers for distributed processing 10-1 and 10-2, learning is performed in a unit of mini batch including a plurality of pieces of input data. In this embodiment, it is assumed that a mini batch including four pieces of input data is given to each of the computers for distributed processing 10-1 and 10-2.

For simplification, focusing on the computer for distributed processing 10-1, the operation of the computer for distributed processing 10-1 will be described with reference to FIG. 4.

First, when four pieces of input data constituting a mini batch are input into the computer for distributed processing 10-1, the accelerators 13-1 to 13-4 which are controlled by the CPU 12 sequentially perform feed forward processing and back propagation processing. More specifically, the accelerators 13-1 to 13-4, first, sequentially perform feed forward processing by pipeline parallelism based on each of the pieces of input data ("FEED FORWARD PROCESSING" phase in FIG. 4). The feed forward processing is processing of performing a product-sum operation of an output of each neuron based on input data and a weight with a neuron of the next layer in order from an input layer of the deep layer neural network DNN; and is executed by the accelerators 13-1 to 13-4 to which layers are assigned. One of "parameters" in the present invention is this weight.

Figure 4:
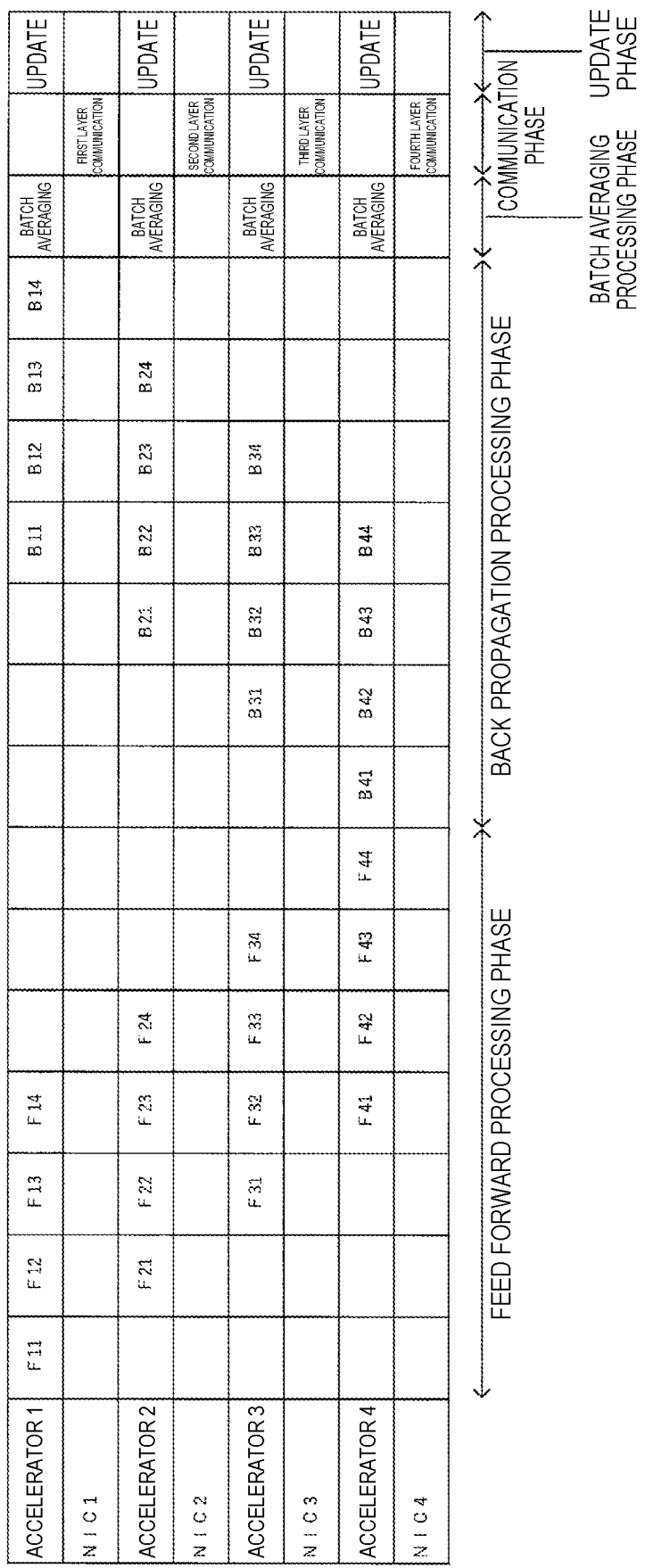
FIG. 4 is a diagram for describing an operation of the computer for distributed processing that constitutes the distributed deep learning system according the first embodiment of the present invention.

When feed forward processing based on all the pieces of input data constituting the mini batch is complete, the accelerators 13-1 to 13-4 sequentially perform back propagation processing by pipeline parallelism ("BACK PROPAGATION PROCESSING" phase in FIG. 4). The back propagation processing is, for example, processing of propagating an error of an output obtained by the feed forward processing, from an output layer to an input layer and thereby determining a gradient of each weight.

As described above, when each of the accelerators 13-1 to 13-4 derives a gradient of each weight based on each of four pieces of input data for each layer, it calculates the average of the gradient of each weight for each layer and takes this average as a learning result based on the mini batch ("BATCH AVERAGING" phase in FIG. 4. Hereinafter, the processing of calculating, in a unit of mini batch, the average of the learning results derived from each piece of input data may be referred to as "mini batch averaging" or simply "batch averaging.")

The processing of calculating the average of the gradient of each weight is performed in parallel among the accelerators 13-1 to 13-4.

The feed forward processing, back propagation processing, and mini batch averaging processing as described above are also performed in the other computer for distributed processing 10-2, for a mini batch including different input data, where the gradient of each weight is obtained.

In each of the computers for distributed processing 10-1 and 10-2, when each of the accelerators 13-1 to 13-4 calculates a learning result, that is, the average of the gradient of each weight for each layer, each of the NICs 14-1 to 14-4 of each of the computers for distributed processing performs the following. The NICs 14-1 to 14-4 of each of the computers for distributed processing, as illustrated in FIG. 4, transmit a learning result of each layer which is derived by the accelerators 13-1 to 13-4 of its own device, to the other computer for distributed processing; and also each of them receives a learning result of each layer which is derived by the accelerators 13-1 to 13-4 of the other computer for distributed processing. The NICs 14-1 to 14-4 of each of the computers for distributed processing obtain a sum of the received learning result and a learning result of each layer which is derived by the accelerators 13-1 to 13-4 of its own device, and transmit it to the other computer.

More specifically, in each of the plurality of computers for distributed processing 10-1 and 10-2, the CINs 14-1 to 14-4 perform communication with corresponding NICs of the other computer for distributed processing 10-2 via the communication network 50, that is, with the NICs which are respectively associated for each layer of the deep layer neural network DNN. The CINs 14-1 to 14-4 transmit and receive information on learning derived for each layer, that is, the average of each weight in each layer and thereby share a learning result which is derived in each of the computers for distributed processing 10-1 and 10-2, that is, the average of each weight ("COMMUNICATION" phase in FIG. 4) As described above, the processing of sharing a learning result by the NICs 14-1 to 14-4 is nothing but the Allreduce processing in the data parallel distributed deep learning.

Each of the plurality of accelerators 13-1 to 13-4 updates each weight included in each layer of the deep layer neural network DNN, by using the learning result shared via each of the NICs 14-1 to 14-4, that is, the gradient of each weight ("UPDATE" phase in FIG. 4)

When each weight is updated, each of the computers for distributed processing 10-1 and 10-2 is given a new mini batch and updates each weight by performing the above-described processing based on input data included in this new mini batch. Such learning processing is repeated a predetermined number of times according to the number of pieces of input data, or until the gradient of each weight becomes smaller than a predetermined value.

Effects of First Embodiment

Each of the computers for distributed processing 10-1 and 10-2 used in the distributed deep learning system 1 according to this embodiment includes the plurality of NICs 14-1 to 14-4 and therefore, communication between the computers for distributed processing 10-1 and 10-2 can be executed in parallel at a device level, thereby reducing overhead. Thus, congestion can be prevented from occurring in sharing a learning result between the computers for distributed processing 10-1 and 10-2, thereby allowing higher-speed learning in the deep layer neural network.

In this embodiment, description has been made by using as an example a case where the distributed deep learning system 1 includes two computers for distributed processing 10-1 and 10-2; however, the number of computers for distributed processing is not limited to two, and three or more computers for distributed processing may be included. In this case, the communication network 50 including a plurality of computers for distributed processing may constitute a ring network or a star network.

In addition, in this embodiment, it has been described that the NICs 14-1 to 14-4 and the accelerators 13-1 to 13-4 are associated with each other on a one-to-one basis; however, in the present invention, the NICs 14-1 to 1-4 and the accelerators 13-1 to 13-4 do not need to be the same in number. That is, the ratio between the accelerators and NICs is only required to be such that congestion does not occur; for example, a plurality of accelerators may be associated with one of a plurality of NICs.

In addition, in this embodiment, description has been made by using, as an example, an aspect in which the deep layer neural network DNN has four layers and each of the computers for distributed processing 10-1 and 10-2 includes four accelerators; however, the number of accelerators is determined according to the number of layers constituting a deep layer neural network DNN and a manner of dividing them.

Furthermore, a mini batch which is given to each of the computers for distributed processing 10-1 and 10-2 has been described for pipeline parallelism processing by using as an example a case of including four pieces of input data; however, the size of the mini batch can be freely defined and there is no limitation to four.

Modification of First Embodiment

Figure 5:
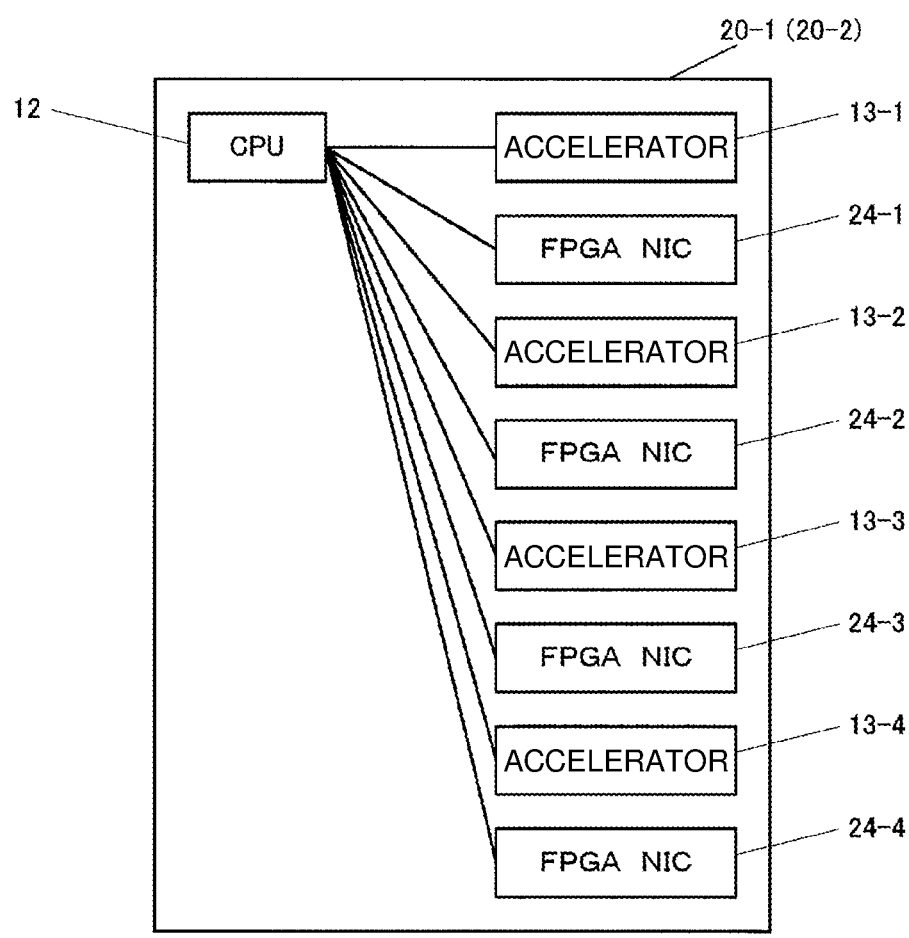
FIG. 5 is a diagram illustrating a configuration of a computer for distributed processing according to a modification of the first embodiment of the present invention.

A computer for distributed processing 20-1 (20-2) according to a modification of the above-described first embodiment is the same as the computer for distributed processing 10-1 (10-2) according to the above-described first embodiment in that it includes the CPU 12 and the plurality of accelerators 13-1 to 13-4, as illustrated in FIG. 5; however, it includes FPGA NICs 24-1 to 24-4 instead of the NICs 14-1 to 14-4 in the computer for distributed processing 10-1 (10-2) according to the first embodiment. On each of these FPGA NICs 24-1 to 24-4, a circuit that executes the Allreduce processing is mounted. Here, the "circuit that executes Allreduce" refers to a circuit that implements a function of: transmitting a learning result received from a corresponding accelerator 13-1 to 13-4 of its own device, to a corresponding FPGA NIC of the other computer for distributed processing; obtaining the sum for the FPGA NICs of all the computers; and distributing its result to all the FPGA NICs.

Figure 6:
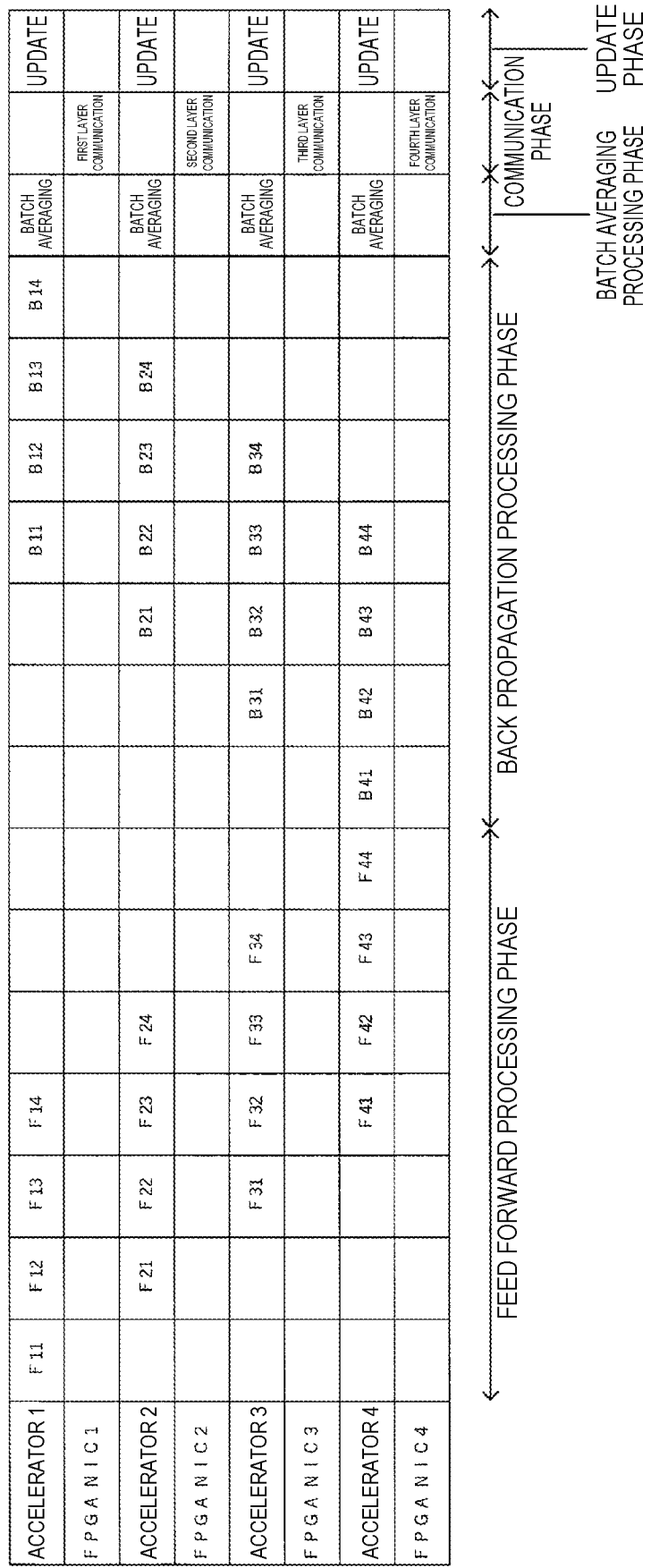
FIG. 6 is a diagram for describing an operation of the computer for distributed processing according to the modification of the first embodiment of the present invention.

The operation of the computer for distributed processing 20-1 (20-2) like this is performed, as illustrated in FIG. 6, in the order of the feed forward processing phase, the back propagation processing phase, the batch averaging phase, the communication phase, and the update phase, as with the computer for distributed processing 10-1 (10-2) according to the first embodiment. However, in the computer for distributed processing 10-1 (10-2) according to the first embodiment, an addition in the Allreduce processing is executed within the accelerators 13-1 to 13-4 and therefore, a compute kernel and a communication kernel are alternately executed. On the other hand, as for the computer for distributed processing 20-1 (20-2) according to this modification, the Allreduce processing is performed in the FPGA NICs 24-1 to 24-4 in the computer for distributed processing 20-1(20-2) according to this modification and therefore, it is only required to command the execution of Allreduce.

Thus, in the computer for distributed processing 10-1 (10-2) according to the first embodiment, overhead occurs when the compute kernel and the communication kernel are alternately executed; however, in the computer for distributed processing 10-1 (10-2) according to the first embodiment, overhead of kernel switching does not occur and therefore, communication time becomes shorter.

Second Embodiment

A computer for distributed processing according to a second embodiment includes a CPU, a plurality of accelerator, and a plurality of FPGA NICs, as with the computer for distributed processing 20-1 (20-2) according to the modification of the first embodiment which is illustrated in FIG. 5. On each of the plurality of FPGA NICs, a circuit that executes the Allreduce processing is mounted, as with the above-described modification of the first embodiment.

An operation of the computer for distributed processing according to the second embodiment will be described with reference to FIG. 7.

For example, in the computer for distributed processing 10-1 (10-2) according to the first embodiment and the computer for distributed processing 20-1 (20-2) according to its modification, the feed forward processing and back propagation processing are performed based on each of the pieces of input data included in a mini batch as illustrated in FIG. 3 and FIG. 6 respectively and mini batch averaging for a learning result of each piece of data is performed; and after that, the Allreduce processing involving communication with the other computer for distributed processing is performed. On the other hand, in the computer for distributed processing according to the second embodiment, each time back propagation computation based on each piece of input data is complete, the Allreduce processing involving communication between the computers is immediately executed and after that, mini batch averaging processing is performed and a parameter value (weight) is updated, as illustrated in FIG. 7. Putting it in another way, in the computer for distributed processing according to the second embodiment, the back propagation processing and Allreduce processing are overlapped to perform pipeline processing for each piece of input data. Therefore, for a plurality of learning results which are derived based on each piece of input data and for which the Allreduce processing has been performed, each of the accelerators calculates the average thereof.

In the computer for distributed processing 10-1 (10-2) according to the first embodiment, when the compute kernel and the communication kernel are alternately executed, overhead occurs. In addition, in the computer for distributed processing 10-1 (10-2) according to the first embodiment, after the accelerators 13-1 to 13-4 perform mini batch averaging, data is transmitted to each of the NICs 14-1 to 14-4, where the Allreduce processing is executed, and is then transmitted to the accelerators again to be updated; thus, there is a positive data movement time.

On the other hand, in the computer for distributed processing according to the second embodiment, overhead of kernel switching does not occur and therefore, communication time becomes shorter. Further, in the computer for distributed processing according to the second embodiment, time for transferring data from an accelerator to an FPGA NIC is hidden by the back propagation processing and thereby, a learning time becomes shorter.

Third Embodiment

Figure 8A:
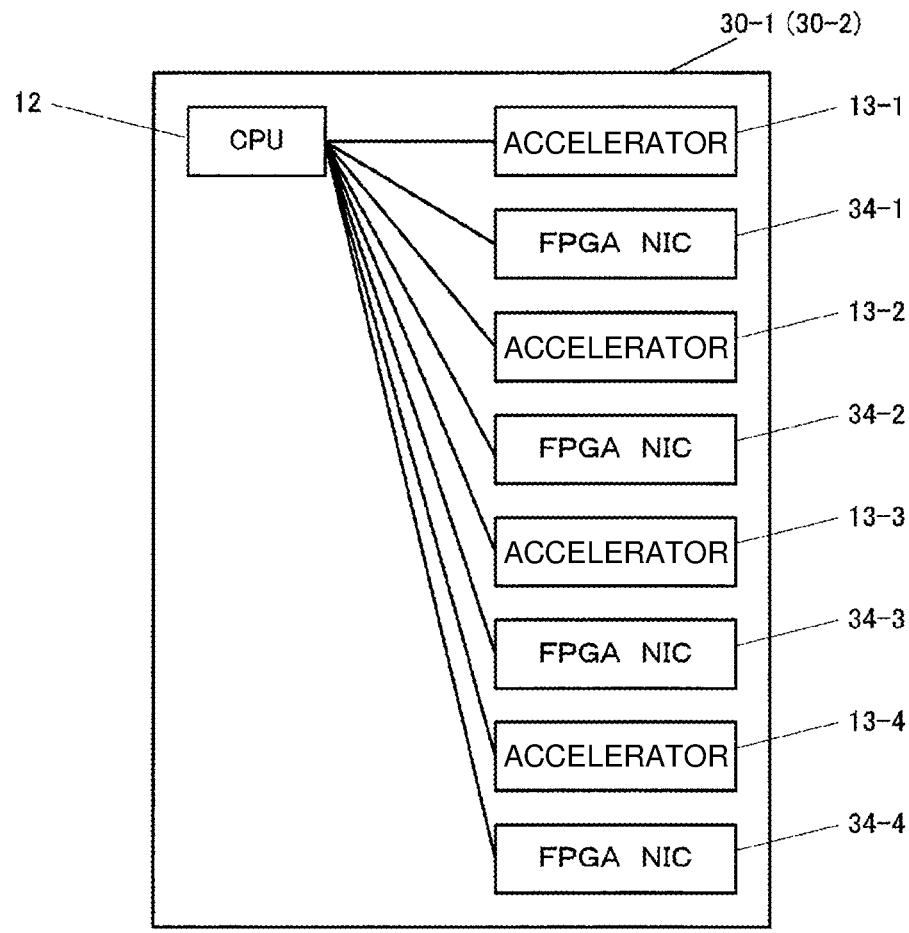
FIG. 8A is a diagram illustrating a configuration of a computer for distributed processing according to a third embodiment of the present invention.
Figure 8B:
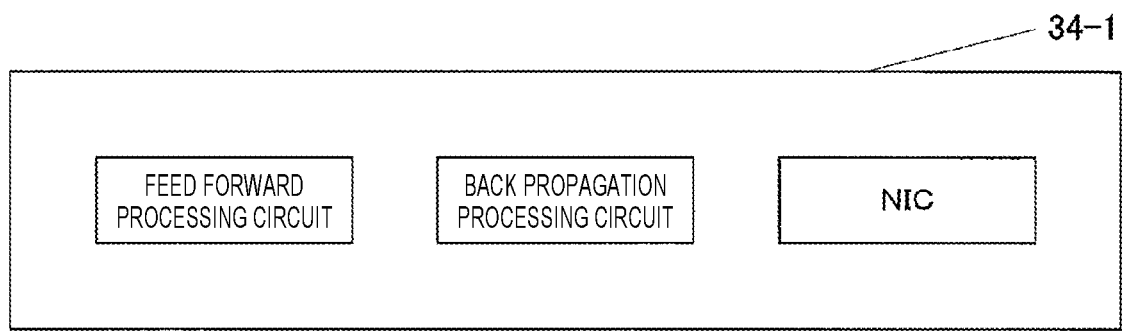
FIG. 8B is a diagram conceptually illustrating a configuration of an FPGA NIC that is used in the computer for distributed processing according to the third embodiment of the present invention.

A computer for distributed processing according to a third embodiment includes, as illustrated in FIG. 8A: a CPU 12; a plurality of accelerators 13-1 to 13-4; and a plurality of FPGA NICs 34-1 to 34-4. On each of the plurality of FPGA NICs 34-1 to 34-4, as illustrated in FIG. 8B, a feed forward processing circuit and a part or the whole of a back propagation processing circuit are mounted together with an NIC.

Figure 9:
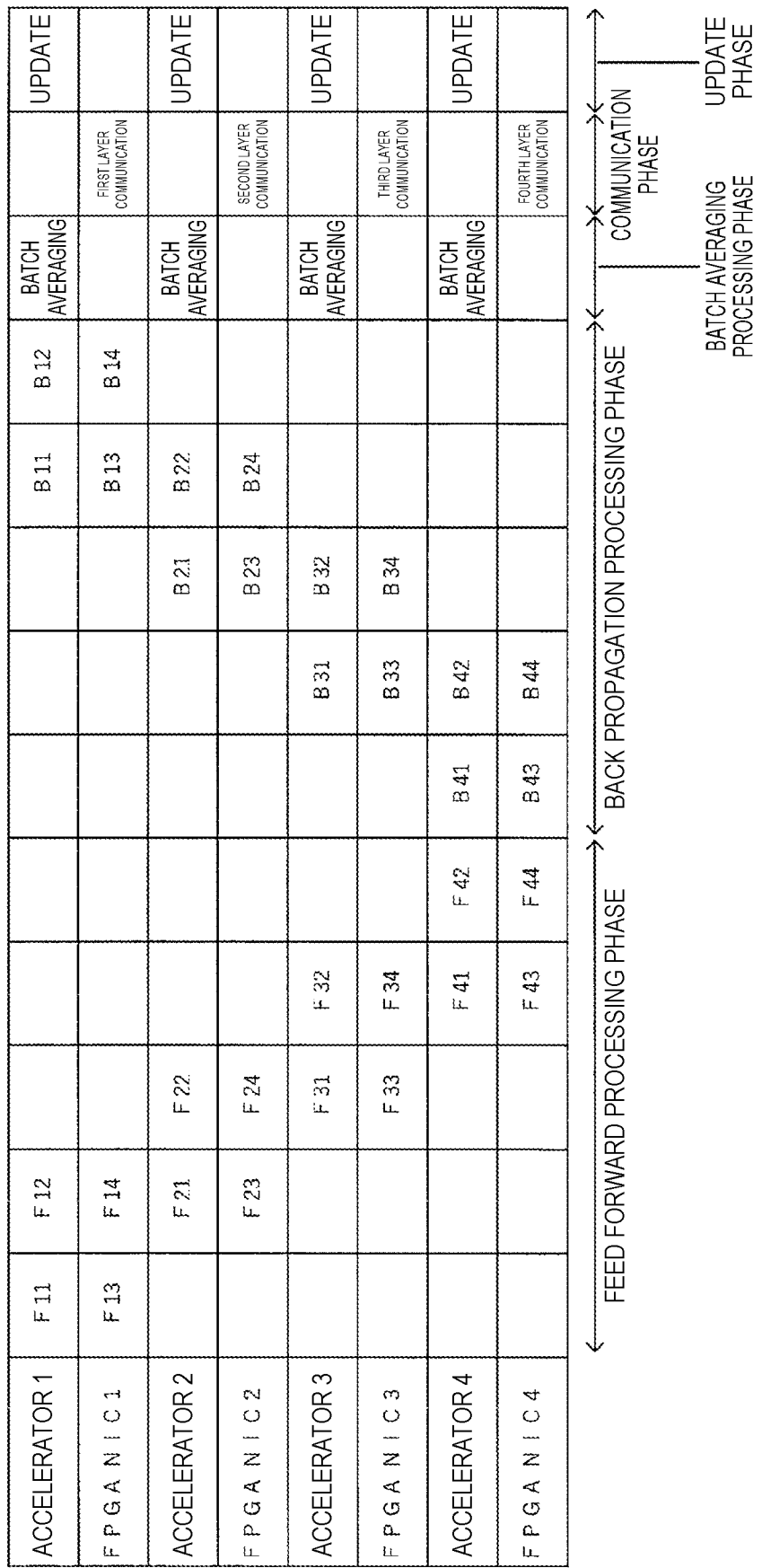
FIG. 9 is a diagram for describing one example of an operation of the computer for distributed processing according to the third embodiment of the present invention.

If each of the FPGA NICs 34-1 to 34-4 includes a feed forward processing circuit and the whole of a back propagation processing circuit together with an NIC (hereinafter, referred to as "case 1"), each of both the accelerators 13-1 to 13-4 and the FPGA NICs 34-1 to 34-4 can process a different piece of input data included in a mini batch in both a feed forward processing phase and a back propagation phase, as illustrated in FIG. 9.

In addition, in a case where each of the FPGA NICs 34-1 to 34-4 includes a feed forward processing circuit and a part of a back propagation processing together with an NIC (hereinafter, referred to as "case 2"), each of both the accelerators 13-1 to 13-4 and the FPGA NICs 34-1 to 34-4 processes a different piece of input data included in a mini batch in the feed forward processing phase; and in the back propagation processing phase, after each of the accelerators 13-1 to 13-4 performs computation for the back propagation processing partway, the computation is taken over to their corresponding FPGA NICs 34-1 to 34-4, mini batch averaging is performed in the accelerators 13-1 to 13-4 or the FPGA NICs 34-1 to 34-4, and communication for the Allreduce processing is performed.

Furthermore, in a case where each of the FPGA NICs 34-1 to 34-4 includes only a feed forward processing circuit, out of the feed forward processing circuit and back propagation processing circuit, together with an NIC (hereinafter, referred to as "case 3"), each of both the accelerators 13-1 to 13-4 and the FPGA NICs 34-1 to 34-4 processes a different piece of data included in a mini batch in the feed forward processing phase; and in the back propagation processing phase, the accelerators 13-1 to 13-4 do not hold intermediate computation required for the back propagation and each of the FPGA NICs 34-1 to 34-4 performs recomputation each time, to execute the back propagation processing.

In any case of the above cases 1 to 3, the FPGA NICs 34-1 to 34-4 implement processing by hardware, unlike conventional von-Neumann accelerators, and therefore, can perform learning at higher speed.

In the above case 1, data throughput in the accelerators 13-1 to 13-4 and the FPGA NICs is doubled for the feed forward processing and the back propagation processing.

In the above case 2, throughput is doubled in the feed forward, and also the back propagation becomes faster by the amount for which the FPGAs perform execution. Furthermore, in a case where mini batch averaging is executed in the FPGAs, data movement is reduced and accordingly overhead is reduced.

In the above case 3, throughput is doubled in the feed forward and since the accelerators can discard intermediate computation, device memory of the accelerators can become more effectively used.

Fourth Embodiment

Figure 10A:
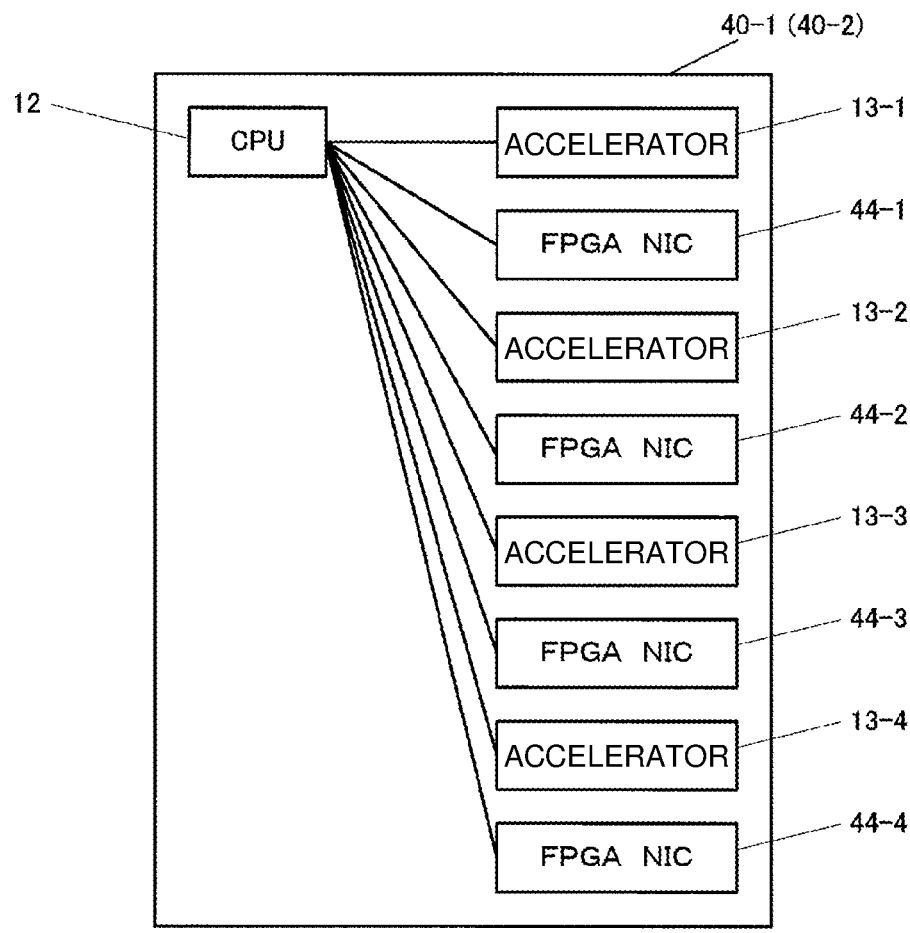
FIG. 10A is a diagram illustrating a configuration of a computer for distributed processing according to a fourth embodiment of the present invention.

A computer for distributed processing 40-1 (40-2) according to a fourth embodiment includes, as illustrated in FIG. 10A: a CPU 12; a plurality of accelerators 13-1 to 13-4; and a plurality of FPGA NICs 44-1 to 44-4.

Figure 10B:
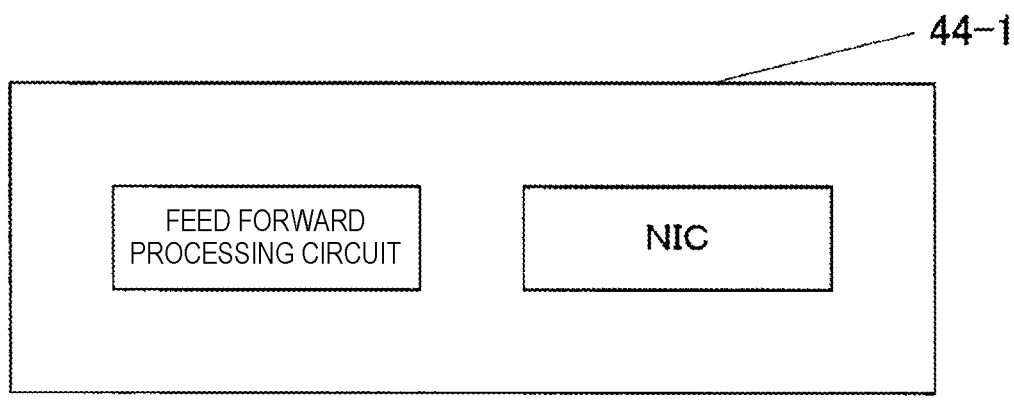
FIG. 10B is a diagram conceptually illustrating a configuration of an FPGA NIC that is used in the computer for distributed processing according to the fourth embodiment of the present invention.
Figure 12:
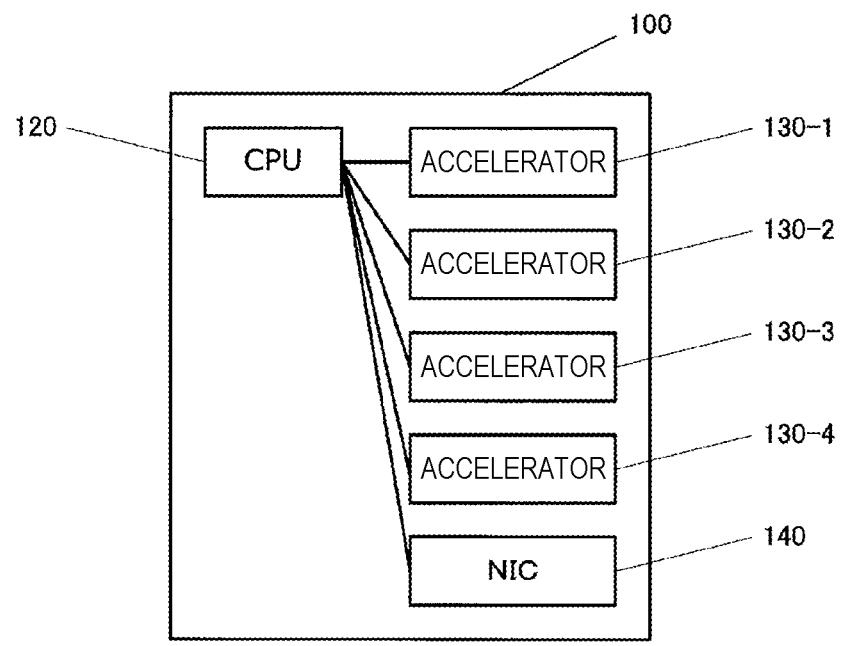
FIG. 12 is a diagram illustrating a configuration of a conventional computer for distributed processing.

Each of the plurality of FPGA NICs 44-1 to 44-4 includes, as illustrated in FIG. 10B, a feed forward processing circuit together with an NIC.

The computer for distributed processing 40-1 (40-2) according to the fourth embodiment sequentially performs, in a feed forward processing phase, feed forward processing based on a plurality of pieces of input data included in a mini batch, by the feed forward processing circuits included in the FPGA NICs 44-1 to 44-4; starts back propagation during the processing of feed forward; and starts communication during the processing of back propagation, as illustrated in FIG. 11.

More specifically, immediately after the FPGA NIC 44-4 to which the fourth layer that is an output layer of the deep layer neural network DNN has been assigned (see FIG. 3) sequentially completes the feed forward processing F41 to F44 based on the input data included in a mini batch, the accelerator 13-4 sequentially performs the back propagation processing B41 to B44. This causes the feed forward and the back propagation to be overlapped with each other. In addition, each of the FPGA NICs 44-1 to 44-4 sequentially starts, subsequently to the feed forward processing, communication with the other computer for distributed processing. This causes the back propagation and the communication to be overlapped with each other.

Thus, due to an overlap between the feed forward and the back propagation and an overlap between the back propagation and the communication, processing time can be further reduced.

As described above, in the deep learning system including the computers for distributed processing according to the embodiments of the present invention, information on learning including a learning result which is derived by each of the plurality of accelerators is transmitted and received in parallel by the plurality of network interface circuits, thus allowing distributed deep learning to be performed in a shorter period of time.

INDUSTRIAL APPLICABILITY

The present invention is applicable to a deep learning system.

REFERENCE SIGNS LIST

1 Distributed deep learning system
10-1, 10-2, 20-1, 30-1, 40-1 Computer for distributed processing
12 CPU
13-1 to 13-4 Accelerator
14-1 to 14-4 NIC
24-1 to 24-4, 34-1 to 34-4, 44-1 to 44-4 FPGA NIC

The invention claimed is:

1. A computer for distributed processing, comprising:
a plurality of accelerators having a part of a neural network assigned to each thereof, each of the plurality of accelerators being configured to derive a learning result based on input data and update each parameter value included in the part of the neural network by using the learning result;
a plurality of network interface circuits, each being configured to transmit and receive information on learning including the learning result; and
an arithmetic processing unit configured to control the plurality of accelerators and the plurality of network interface circuits so as to cause each of the plurality of accelerators to derive a learning result based on input data and so as to cause the plurality of network interface circuits to transmit and receive, in parallel, information on learning including the learning result derived by each of the plurality of accelerators, wherein
the plurality of accelerators perform, in pipelines, feed forward processing and back propagation processing, for a mini batch including a plurality of pieces of input data, based on each of the plurality of pieces of input data, thereby deriving a plurality of learning results based on each of the plurality of pieces of input data; and
the plurality of network interface circuits sequentially transmit and receive information on learning with the back propagation processing overlapped each time the plurality of accelerators derive the plurality of learning results based on the plurality of pieces of input data included in the mini batch, the information on learning including the learning results.

2. The computer for distributed processing according to claim 1, wherein
to the plurality of accelerators, a plurality of layers constituting the neural network are respectively assigned as the part of the neural network; and
the plurality of accelerators execute feed forward processing and back propagation processing for each of the plurality of layers.

3. The computer for distributed processing according to claim 1, wherein
the plurality of network interface circuits transmit and receive, in parallel, information on learning including the learning result when the plurality of accelerators derive the learning result.

4. The computer for distributed processing according to claim 3, wherein
the plurality of accelerators perform:
feed forward processing and back propagation processing in pipelines, for a mini batch including a plurality of pieces of input data, based on each of the plurality of pieces of input data, thereby deriving a plurality of learning results based on the each of the plurality of pieces of input data; and
calculating an average of the derived plurality of learning results as a learning result based on the mini batch; and
the plurality of network interface circuits transmit and receive, in parallel, information on learning including the plurality of learning results when the plurality of accelerators calculate the plurality of learning results based on the plurality of pieces of input data.

5. The computer for distributed processing according to claim 1, wherein
the plurality of network interface circuits are provided so that the number thereof is a same as the plurality of accelerators.

6. A distributed deep learning system, comprising:
a plurality of computers that are communicably connected with each other,
wherein each of the plurality of computers is a computer for distributed processing, each of the plurality of computers comprising:
a plurality of accelerators having a part of a neural network assigned to each thereof, each of the plurality of accelerators being configured to derive a learning result based on input data and update each parameter value included in the part of the neural network by using the learning result;
a plurality of network interface circuits, each being configured to transmit and receive information on learning including the learning result; and
an arithmetic processing unit configured to control the plurality of accelerators and the plurality of network interface circuits so as to cause each of the plurality of accelerators to derive a learning result based on input data and so as to cause the plurality of network interface circuits to transmit and receive, in parallel, information on learning including the learning result derived by each of the plurality of accelerators, wherein
the plurality of accelerators perform, in pipelines, feed forward processing and back propagation processing, for a mini batch including a plurality of pieces of input data, based on each of the plurality of pieces of input data, thereby deriving a plurality of learning results based on each of the plurality of pieces of input data; and
the plurality of network interface circuits sequentially transmit and receive information on learning with the back propagation processing overlapped each time the plurality of accelerators derive the plurality of learning results based on the plurality of pieces of input data included in the mini batch, the information on learning including the learning results.

7. The distributed deep learning system according to claim 6, wherein
the plurality of network interface circuits of one computer out of the plurality of computers transmit and receive, in parallel, a plurality of learning results derived by each of the plurality of accelerators of the one computer and a plurality of learning results derived by each of a plurality of accelerators of another computer of the plurality of computers; and
the plurality of accelerators of the one computer update the parameter value based on both the learning results derived by the plurality of accelerators and the plurality of learning results received from the other computer via the plurality of network interface circuits.

8. The distributed deep learning system according to claim 6, wherein
the plurality of network interface circuits are provided so that the number thereof is a same as the plurality of accelerators.

9. The distributed deep learning system according to claim 6, wherein
to the plurality of accelerators, a plurality of layers constituting the neural network are respectively assigned as the part of the neural network; and
the plurality of accelerators execute feed forward processing and back propagation processing for each of the plurality of layers.

10. The distributed deep learning system according to claim 6, wherein
the plurality of network interface circuits transmit and receive, in parallel, information on learning including the learning result when the plurality of accelerators derive the learning result.

11. The distributed deep learning system according to claim 6, wherein
the plurality of accelerators perform:
feed forward processing and back propagation processing in pipelines, for a mini batch including a plurality of pieces of input data, based on each of the plurality of pieces of input data, thereby deriving a plurality of learning results based on the each of the plurality of pieces of input data; and
calculating an average of the derived plurality of learning results as a learning result based on the mini batch; and
the plurality of network interface circuits transmit and receive, in parallel, information on learning including the plurality of learning results when the plurality of accelerators calculate the plurality of learning results based on the plurality of pieces of input data.

12. A method of distributed processing having a plurality of accelerators having a part of a neural network assigned to each thereof, the method comprising:
deriving, by each of the plurality of accelerators, a learning result based on input data and update each parameter value included in the part of the neural network by using the learning result;
transmitting, by a first network interface circuit of a plurality of network interface circuits, information on learning including the learning result;
receiving, by a second network interface circuit of a plurality of network interface circuits, information on learning including the learning result; and
controlling, by an arithmetic processing unit, the plurality of accelerators and the plurality of network interface circuits so as to cause each of the plurality of accelerators to derive a learning result based on input data and so as to cause the plurality of network interface circuits to transmit and receive, in parallel, information on learning including the learning result derived by each of the plurality of accelerators;
wherein the deriving comprises performing, by each of the plurality of accelerators, feed forward processing and back propagation processing in pipelines for a mini batch including a plurality of pieces of input data, based on each of the plurality of pieces of input data, thereby deriving a plurality of learning results based on each of the plurality of pieces of input data; and
wherein the transmitting and receiving comprise sequentially transmitting and receiving, by the plurality of network interface circuits, information on learning with the back propagation processing overlapped each time the plurality of accelerators derive the plurality of learning results based on the plurality of pieces of input data included in the mini batch, the information on learning including the learning results.

* * * * *